Patented May 12, 1925.

1,537,252

UNITED STATES PATENT OFFICE.

JOHANNES FRIEDRICH MEYER AND HANS LÜCKER, OF BERLIN, GERMANY.

PROCESS OF PRODUCING NEARLY NONALCOHOLIC LIQUORS.

No Drawing.   Application filed May 10, 1924.   Serial No. 712,471.

*To all whom it may concern:*

Be it known that we, JOHANNES FRIEDRICH MEYER and HANS LÜCKER, both citizens of the German Republic, and residing in Berlin, Germany, have invented certain new and useful Improvements in a Process of Producing Nearly Nonalcoholic Liquors, of which the following is a specification.

This invention has reference to the production of liquors and beverages and it refers in particular to a process of producing beverages and liquors of low alcoholic content and in which the small amount of alcohol still existing therein is obtained by interrupting the fermentation by cooling the fermenting liquor, and the products of fermentation and the clearing of the liquid after the interruption of the fermentation being effected under pressure by centrifugal action, and without the assistance of filtering layers.

It is not new by itself to cool fermenting liquors for the interruption of the fermentation; nor is it new to carry on the fermentation and clearing of the liquid in similar methods by pressure during both fermentation and clarifications, to prevent escape of carbon dioxide acid gas produced in the wort during fermentation. It is, however, impracticable to obtain a beverage that is fit for use by a combination of these different steps. In consequence of the strong cooling particularly the undissolved albuminous matter is separated out in such form and conditions as to render the filtration in the ordinary beer filters and the like substantially impossible, the filters being choked up after a very short time. Only by carrying on the clarification by centrifugal action and without filtering layers it has become possible to produce a satisfactory product.

In the practical execution of the process according to our invention we may for instance proceed as stated in the following example. A supply of beer wort obtained in the usual manner of procedure with for instance, say from 6 to 8 per cent of extractive matter, is cooled to 12 degrees C. and is then fermented in closed containers with the addition of 100 grammes compressed yeast for each hectoliter (about 26½ glls.), means being preferably provided for keeping the fermenting vat from the start under increased pressure, in order to prevent escape of carbon dioxide. When it is, for instance desired, to manufacture beer with a content of alchol of 0.5% by volume, about 0.9 per cent of extract are fermented, which will require about 14 hours. Then, the fermenting liquor is caused to pass through a cooling apparatus and into a storing vessel which is proof against pressure, the liquor being cooled to interrupt the fermentation. All these different steps are carried on under corresponding counter-pressure, in order to prevent escape of carbon dioxide, and with the employment of the necessary pressure compensating devices. The clarification is also effected under counter-pressure in a closed centrifugal machine. By means of this treatment any subsequent or post-fermentation is prevented by the separating out of the fermentation generators that are still liable to be present, and which by the mere strong cooling are possibly not eliminated with absolute certainty.

In order to render the beer ready for shipment it may be run again through the same or any equivalent clearing centrifugal machine, which, of course, should likewise be effected under counter-pressure.

A kind of beer obtained in this manner is fit to drink after from 2 to 3 days; it contains from 5 to 7% of extract, and the usual contents of natural carbon dioxide acid the escape of which has been prevented by the continuous working under counter-pressure. The taste of the beverage is almost like that of alcoholic beers which has not been the case with the beverages heretofore obtained by fermentation in open vessels in view of the escape of the carbon dioxide. The new process presents the further advantage that about 30 to 45 per cent of malt are saved for each hectoliter. The mode of procedure heretofore described may be used broadly for the purpose of conducting an alcoholic fermentation in such a manner that only a limited amount of extract is fermented for the manufacture of feebly alcoholic beverages and liquors, and without losing the small amount of carbon dioxide liberated.

The clarification by centrifugal means may also be effected in two or more stages; thus, we may for instance effect a preliminary clarification in the first stage and a refining clarification in the second stage. The preliminary clarification serves mainly for the purpose of aiding the interruption of fermentation which has been initiated by cooling. In the first stage two or more centrifugal machines in parallel connection may be used which are alternately operated, so as to maintain the continuity of the working process. Also a plurality of stages may be used in such a manner that the liquor is freed from the yeast in the first stages, while the last stages serve for the refining clarification. A plurality of conduits may be used each of which contains a centrifugal machine, and the liquid is conducted preferably alternatingly through one or the other of said parallel conduits.

Various other modes of embodiment of the principles of this invention may be employed in the practical operation thereof, and the invention is susceptible of modifications to better adapt it to varying conditions of application, and without deviating from the spirit thereof, as set forth in the claims hereunto appended.

We claim:—

1. A process of making a carbonated beverage containing less than one-half of one per cent of alcohol by volume which consists in adding yeast to a malt wort and allowing the wort to undergo alcoholic fermentation in a closed space, to prevent the escape of carbon dioxide, stopping the fermentation when the percentage of alcohol by volume in the wort is less than one-half of one per cent, by cooling the wort, and then immediately centrifugally separating the yeast and other solid matter from the liquid portion of the wort while maintaining a pressure thereon sufficient to prevent the escape of carbon dioxide therefrom.

2. The process of making a beverage which is nearly free from alcohol, in a closed container from malt wort and yeast, consisting in maintaining a mixture of malt wort and yeast at a yeast fermentation temperature and preventing the escape of the resulting carbon dioxide therefrom, stopping the fermentation by cooling when the amount of alcohol has reached the limit allowed by the national prohibition act, and in then immediately clearing and clarifying the resulting product including the removal of yeast therefrom by subjecting the said product to centrifugal action while maintaining the pressure developed by the fermentation.

Dr. JOHANNES FRIEDRICH MEYER.
HANS LÜCKER.

Witnesses:
C. KASPAUH,
M. BLUNT.